US012587878B2

(12) United States Patent
Zhang et al.

(10) Patent No.: US 12,587,878 B2
(45) Date of Patent: Mar. 24, 2026

(54) MULTIPLE CHANNEL STATE INFORMATION REFERENCE SIGNAL RESOURCE INDICATOR REPORT

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 599 days.

(21) Appl. No.: 18/050,747

(22) Filed: Oct. 28, 2022

(65) Prior Publication Data

US 2024/0147270 A1    May 2, 2024

(51) Int. Cl.
| | |
|---|---|
| *H04W 24/08* | (2009.01) |
| *H04L 5/00* | (2006.01) |
| *H04W 24/10* | (2009.01) |

(52) U.S. Cl.
CPC ........... *H04W 24/08* (2013.01); *H04L 5/0051* (2013.01); *H04W 24/10* (2013.01)

(58) Field of Classification Search
CPC ...... H04W 24/08; H04W 24/10; H04L 5/0051
See application file for complete search history.

(56) References Cited

U.S. PATENT DOCUMENTS

| | | | | |
|---|---|---|---|---|
| 2020/0276287 A1* | 9/2020 | Melief | ............... | A61K 40/4272 |
| 2021/0329473 A1* | 10/2021 | Zhang | ................... | H04B 7/0696 |
| 2022/0302976 A1* | 9/2022 | Zhang | ................... | H04L 5/0057 |
| 2023/0100009 A1* | 3/2023 | Niu | ....................... | H04B 7/0617 |
| | | | | 370/252 |
| 2024/0015537 A1* | 1/2024 | Zhang | ................... | H04L 5/0035 |

FOREIGN PATENT DOCUMENTS

| | | | | | |
|---|---|---|---|---|---|
| WO | WO-2020144624 A1 * | 7/2020 | | ............ | H04W 24/10 |
| WO | WO-2024135882 A1 * | 6/2024 | | | |

* cited by examiner

*Primary Examiner* — Deepa Belur
(74) *Attorney, Agent, or Firm* — ArentFox Schiff, LLP

(57) ABSTRACT

A first user equipment (UE) receives a configuration of a channel state information (CSI) report from a base station. The configuration includes an indication of a sounding reference signal (SRS) or uplink demodulation reference signal (DMRS) transmitted from a second UE as an interference measurement resource (IMR). The base station configures the second UE to transmit the SRS or the uplink DMRS on the IMR. The first UE measures the IMR to determine a cross-link interference of the second UE to the first UE. The UE transmits the CSI report. The CSI report includes at least one channel characteristic that takes into account the cross-link interference of the second UE. The CSI report may include information for a plurality of CSI-RS resource indicators (CRIs), each CRI associated with a same channel measurement resource (CMR) and a different IMR corresponding to a different second UE.

23 Claims, 11 Drawing Sheets

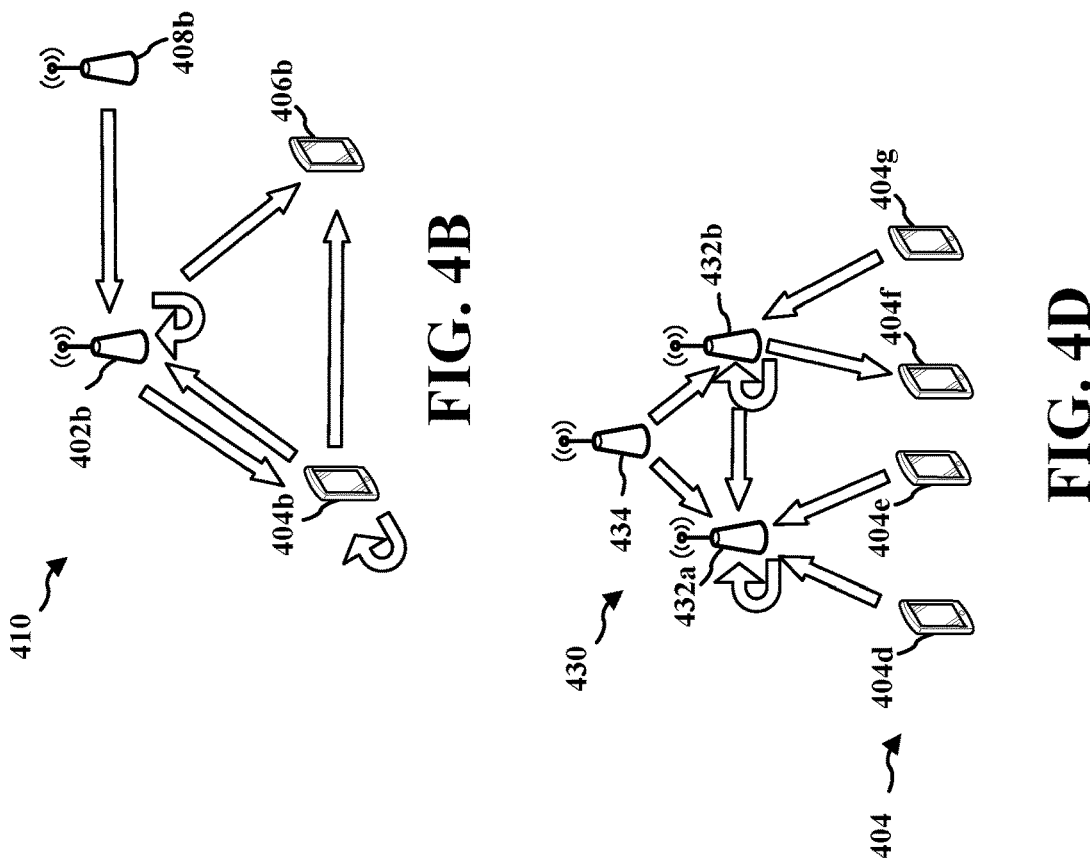
FIG. 4B
FIG. 4D
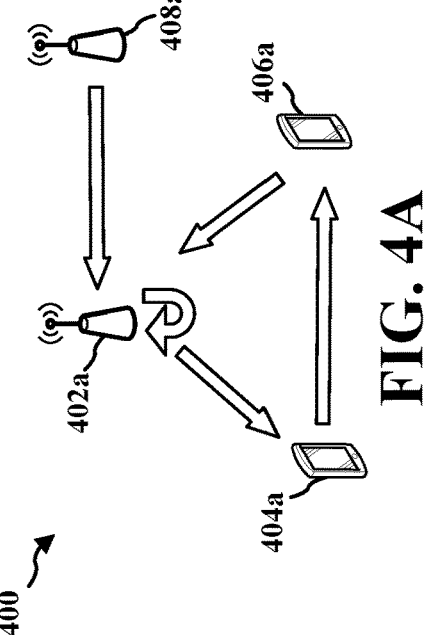
FIG. 4A
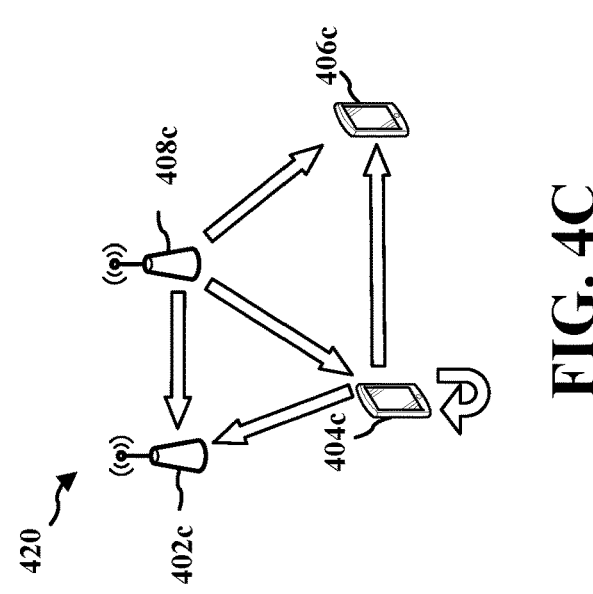
FIG. 4C

700

| CRI #0 682a | RI 684a | LI 686a | CQI 690a | L1 RSRP 710a | No CLI |
| CRI #0 682b | RI 684b | LI 686b | CQI 690b | L1 RSRP 710b | CLI from UE 1 |
| ⋮ | | | | | |
| CRI #0 682n | RI 684n | LI 686n | CQI 690n | L1 RSRP 710n | CLI from UE N |

1000

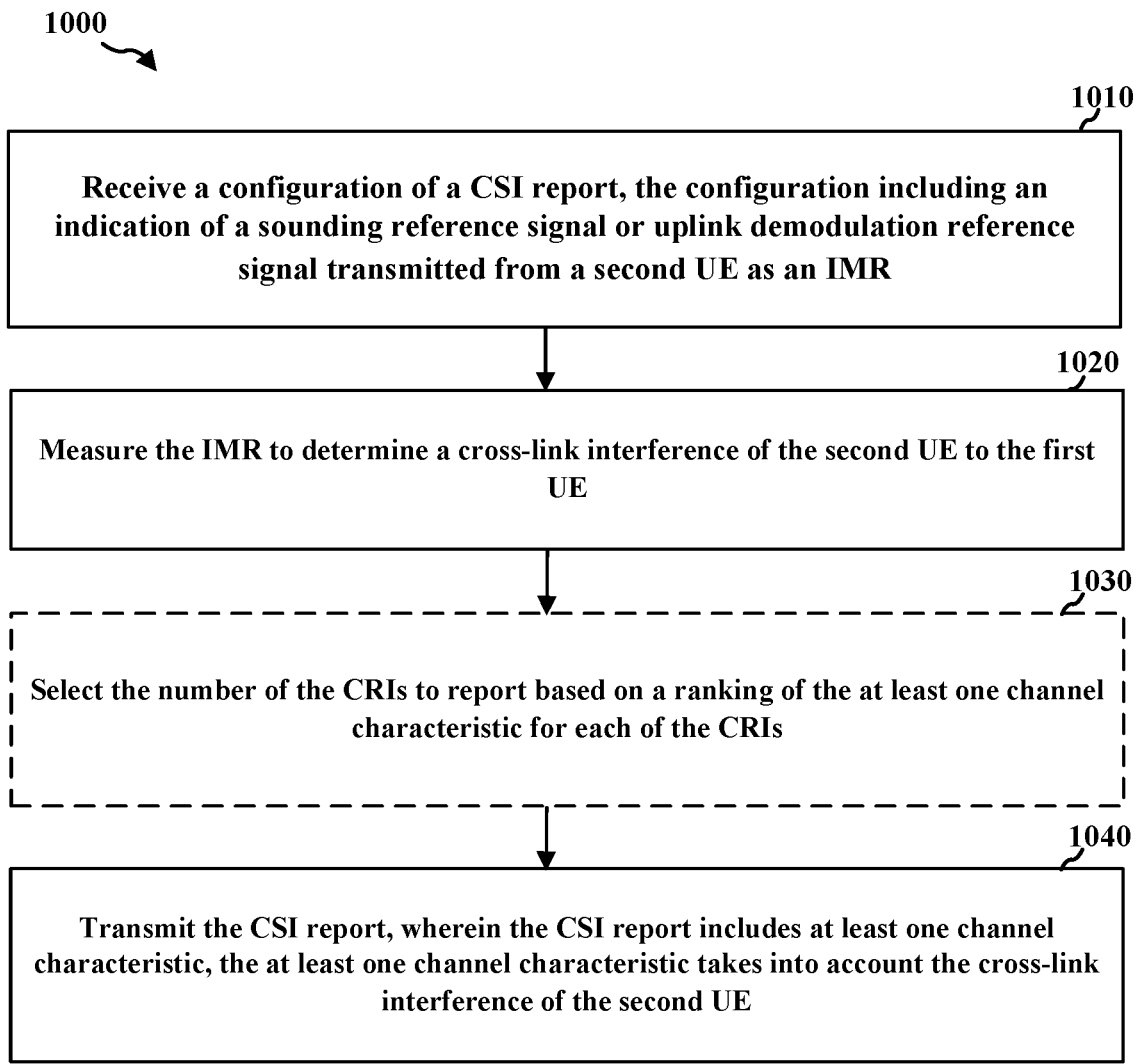

1010

Receive a configuration of a CSI report, the configuration including an indication of a sounding reference signal or uplink demodulation reference signal transmitted from a second UE as an IMR

1020

Measure the IMR to determine a cross-link interference of the second UE to the first UE

1030

Select the number of the CRIs to report based on a ranking of the at least one channel characteristic for each of the CRIs

1040

Transmit the CSI report, wherein the CSI report includes at least one channel characteristic, the at least one channel characteristic takes into account the cross-link interference of the second UE

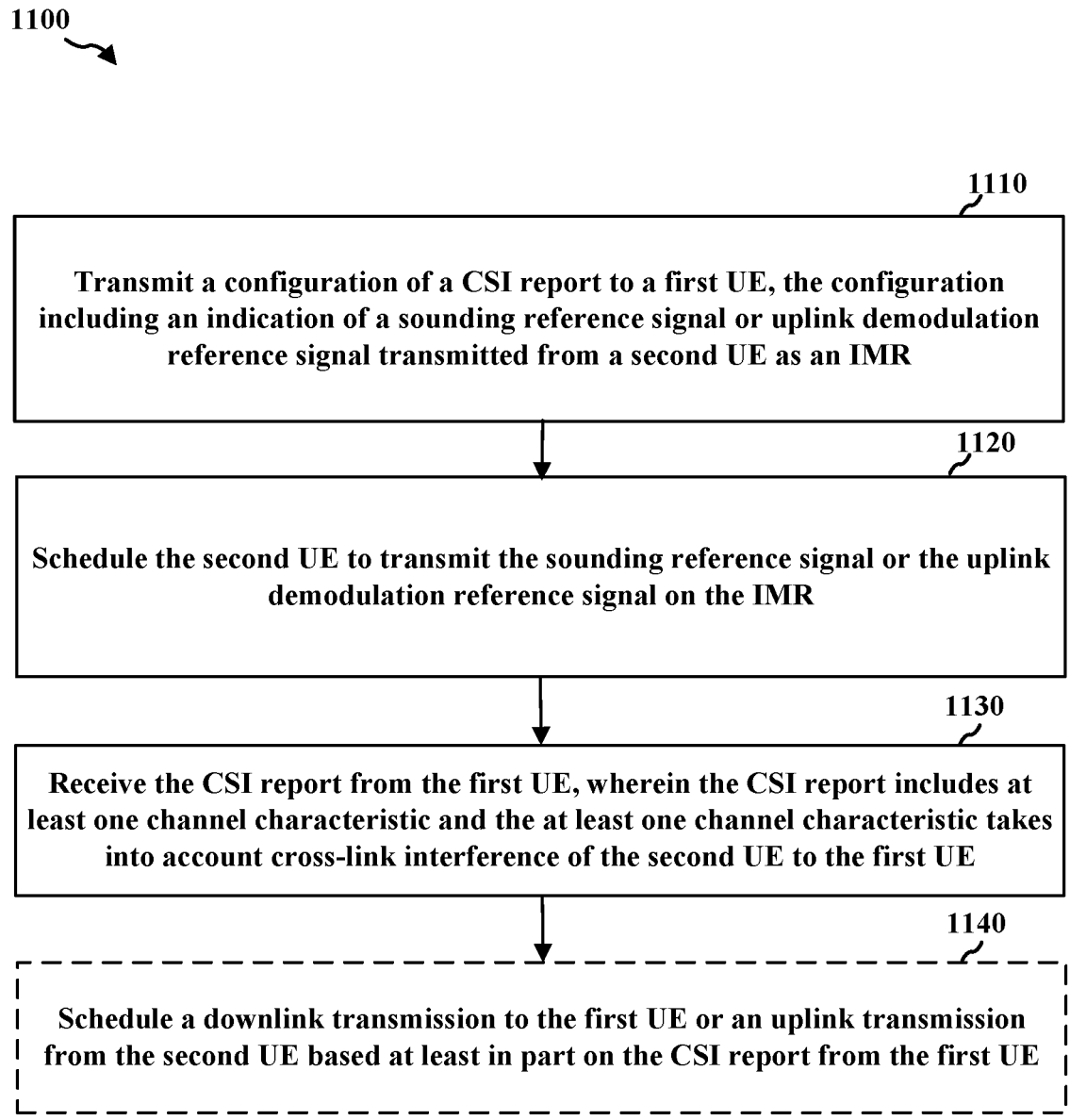

1110

Transmit a configuration of a CSI report to a first UE, the configuration including an indication of a sounding reference signal or uplink demodulation reference signal transmitted from a second UE as an IMR

1120

Schedule the second UE to transmit the sounding reference signal or the uplink demodulation reference signal on the IMR

1130

Receive the CSI report from the first UE, wherein the CSI report includes at least one channel characteristic and the at least one channel characteristic takes into account cross-link interference of the second UE to the first UE

1140

Schedule a downlink transmission to the first UE or an uplink transmission from the second UE based at least in part on the CSI report from the first UE

FIG. 11

MULTIPLE CHANNEL STATE INFORMATION REFERENCE SIGNAL RESOURCE INDICATOR REPORT

BACKGROUND

Technical Field

The present disclosure relates generally to communication systems, and more particularly, to a multiple channel state information (CSI) reference signal (RS) resource indicator (CRI) report.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a non-transitory computer-readable medium, and an apparatus for a victim user equipment (UE) are provided. The method includes receiving a configuration of a channel state information (CSI) report, the configuration including an indication of a sounding reference signal or uplink demodulation reference signal transmitted from a second UE as an interference measurement resource (IMR). The method includes measuring the IMR to determine a cross-link interference of the second UE to the first UE. The method includes transmitting the CSI report, wherein the CSI report includes at least one channel characteristic, the at least one channel characteristic takes into account the cross-link interference of the second UE.

The present disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

In another aspect, the disclosure provides a method, a non-transitory computer-readable medium, and an apparatus for a base station. The method includes transmitting a configuration of a CSI report to a first UE, the configuration including an indication of a sounding reference signal or uplink demodulation reference signal transmitted from a second UE as an IMR. The method includes scheduling the second UE to transmit the sounding reference signal or the uplink demodulation reference signal on the IMR. The method includes receiving the CSI report from the first UE, wherein the CSI report includes at least one channel characteristic and the at least one channel characteristic takes into account cross-link interference of the second UE to the first UE.

The present disclosure also provides an apparatus (e.g., a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 4A, 4B, 4C, and 4D illustrate exemplary modes of full-duplex communication, in accordance with certain aspects of the present description.

FIG. 10 is a flowchart of an example method of CSI reporting for a UE taking into account CLI from a second UE, in accordance with certain aspects of the present description.

FIG. 11 is a flowchart of an example method of configuring a UE for CSI reporting based on CLI form a second UE, in accordance with certain aspects of the present description.

DETAILED DESCRIPTION

Figure 1:
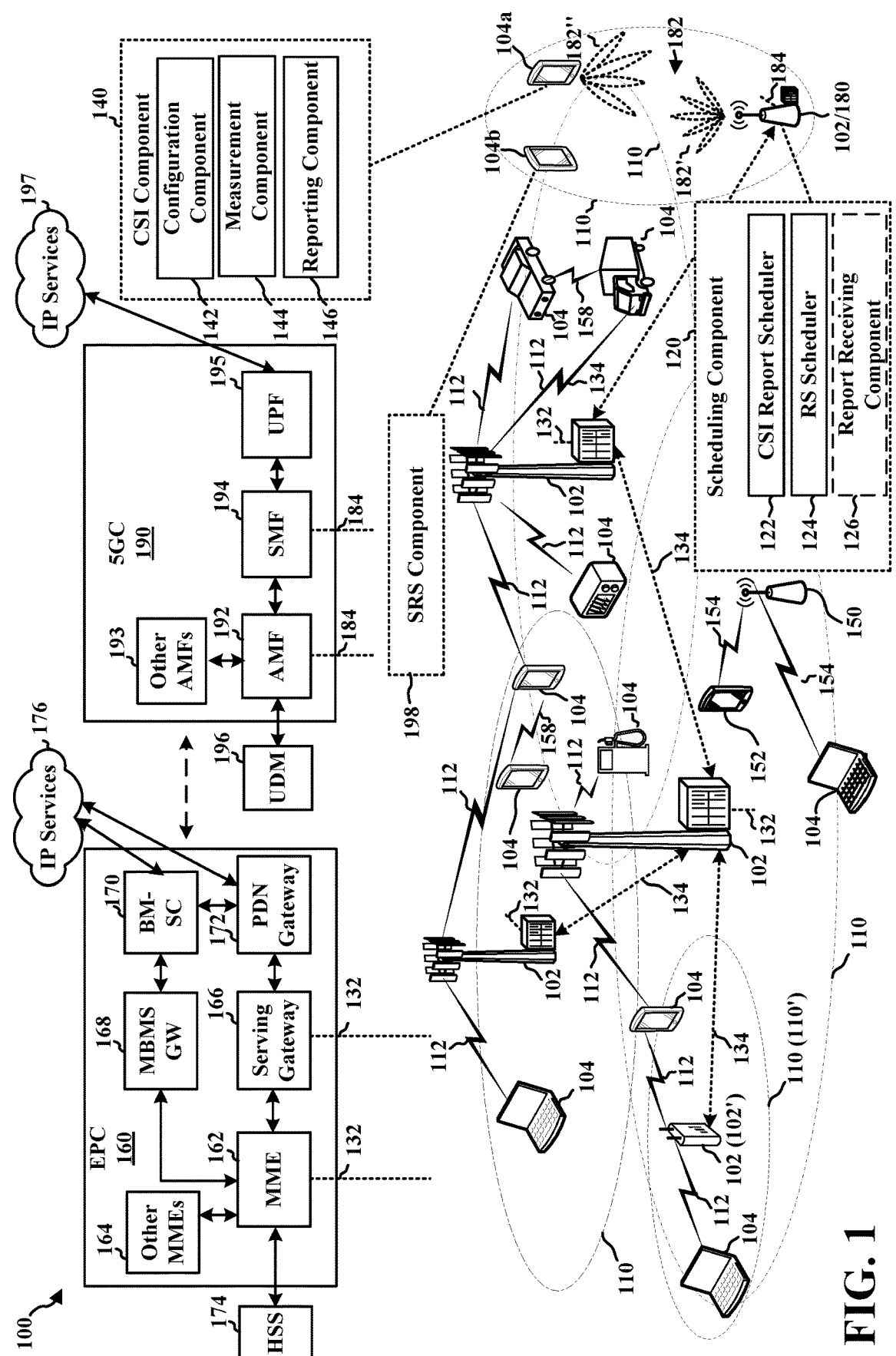
FIG. 1 is a diagram illustrating an example of a wireless communications system including an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

Full duplex communication may allow a wireless communication device to transmit and receive at the same time. In-band full duplex (IBFD) may refer to transmission and reception on the same time and frequency resource. The uplink (UL) and the downlink (DL) may share the same IBFD time and frequency resource, which may include fully overlapping resources or partially overlapping resources. Sub-band frequency division duplexing (SBFD) may refer to transmission and reception at the same time on different frequency resources. The DL resource may be separated from the UL resource in the frequency domain. In an access network, a base station and/or a user equipment (UE) may be capable of either IBFD or SBFD.

The presence of full duplex devices in an access network may result in configurations with different types of interference experienced by a UE. Inter-cell interference may include interference from other gNBs and exist without the presence of full duplex devices. Channel state information (CSI) measurements may be used to measure inter-cell interference. Inter-cell cross-link interference (CLI) may occur between UEs in adjacent cells. Intra-cell CLI may occur between UEs in the same cell. For example, an uplink transmission from an aggressor UE may interfere with a downlink reception of a victim UE. In the case of a full-duplex UE, self-interference (SI) may be considered a special case of intra-cell CLI, where the transmitter of the UE acts as an aggressor UE that interferes with a downlink reception by the receiver of the UE. Interference among transmissions from different panels of a device (e.g., a base station) to different recipients (e.g., UEs) may be referred to as clutter. Additionally, SBFD may result in various forms of inter-sub-band cross-link interference, for example, where a transmission on an uplink sub-band interferes with a reception on a downlink sub-band.

Existing techniques for measuring CLI may not account for some types of CLI. For example, conventional interference resource configurations may allow for configuration of only interference resources for interference from other cells. Such configurations may not allow a UE to measure inter-cell CLI between UEs or intra-cell CLI. Further, even if a UE is configured to measure cross-link interference from another UE, signaling of the configuration and reporting of such measurements may raise issues due to the expanded possibilities of interference types.

In an aspect, the present disclosure provides for configuring a victim UE to generate one or more CSI reports that include channel characteristics that take into account CLI from at least a second UE. For example, the victim UE can be configured with different channel state information (CSI) reference signal (RS) indicators (CRIs) that are associated with different interference measurement resources (INRs). The UE may measure CLI based on the IMR. The CSI report includes at least one channel characteristic that takes into account the CLI from the second UE. In some implementations, each CRI may be associated with the same a same channel measurement resource (CMR) and a different IMR corresponding to a different second UE. The UE may report CSI channel characteristics for multiple CRIs, for example, as multiple CSI reports or as a multi-CRI report. The reporting of CSI for different CRIs may allow the base station to determine the relative CLI for each second UE. The base station may mitigate CLI, for example, by scheduling combinations of UEs with low CLI or good channel characteristics for concurrent communication.

Particular implementations of the subject matter described in this disclosure can be implemented to realize one or more of the following potential advantages. Measurement and reporting of CSI that accounts for inter-UE CLI may allow mitigation of the CLI, for example, based on scheduling. The UE may experience better channel conditions resulting in better throughput, fewer retransmissions, and reduced latency. In some implementations, signaling overhead for the CSI reports for multiple CRIs may be reduced by including multiple CRIs in a single report. Reporting differential values for subsequent CRIs may further reduce the signaling overhead.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network (e.g., a 5G Core (5GC) 190). The UEs 104 may include an victim UE 104a and an aggressor UE 104b. It should be appreciated that the aggressor UE and the victim UE may depend on a particular scenario and may change depending on, for example, scheduling of uplink and downlink communications. The base stations 102 may include macrocells (high power cellular base station) and/or small cells (low power cellular base station). The macrocells include base stations. The small cells include femtocells, picocells, and microcells.

One or more of the UEs 104 (e.g., a victim UE 104a) may include a CSI component 140 that measures CLI from one or more other UEs and reports CSI that accounts for the CLI to the base station 102. The CSI component 140 may include a configuration component 142 configured to receive a configuration of a channel state information (CSI) report. The configuration includes an indication of a sounding reference signal (SRS) or uplink demodulation reference signal (DMRS) transmitted from a second UE (e.g., aggressor UE 104b) as an interference measurement resource (IMR). The CSI component 140 may include a measurement component 144 configured to measure the IMR to determine a CLI of the second UE to the first UE. The CSI component 140 may include a reporting component 146 configured to transmit the CSI report. The CSI report includes at least one channel characteristic. The at least one channel characteristic takes into account the cross-link interference of the second UE.

In an aspect, one or more of the aggressor UEs 104a may include a reference signal (RS) component 198 configured to transmit an RS such as a SRS or uplink DMRS, which may be used by the victim UE 104b for CLI measurements.

In an aspect, one or more of the base stations 102 may include a scheduling component 120 that performs the actions of the base station as described herein (e.g., scheduling the scheduling victim UEs to measure CLI and aggressor UEs to transmit SRS. For example, the scheduling component 120 may include a CSI report scheduler 122 configured to transmit a configuration of a CSI report to a first UE. The configuration includes an indication of a SRS or uplink DMRS transmitted from a second UE as an IMR. The scheduling component 120 may include a RS scheduler 124 configured to schedule the second UE to transmit the SRS or the uplink DMRS on the IMR. The scheduling component 120 may include a report receiving component 126 configured to receive the CSI report from the second UE. The CSI report includes at least one channel characteristic and the at least one channel characteristic takes into account cross-link interference of the second UE to the first UE.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., 51 interface). The backhaul links 132 may be wired or wireless. The base stations 102 configured for 5G NR (collectively referred to as Next Generation RAN (NG-RAN)) may interface with 5GC 190 through backhaul links 184. The backhaul links 184 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and a physical sidelink feedback channel (PSFCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6

GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
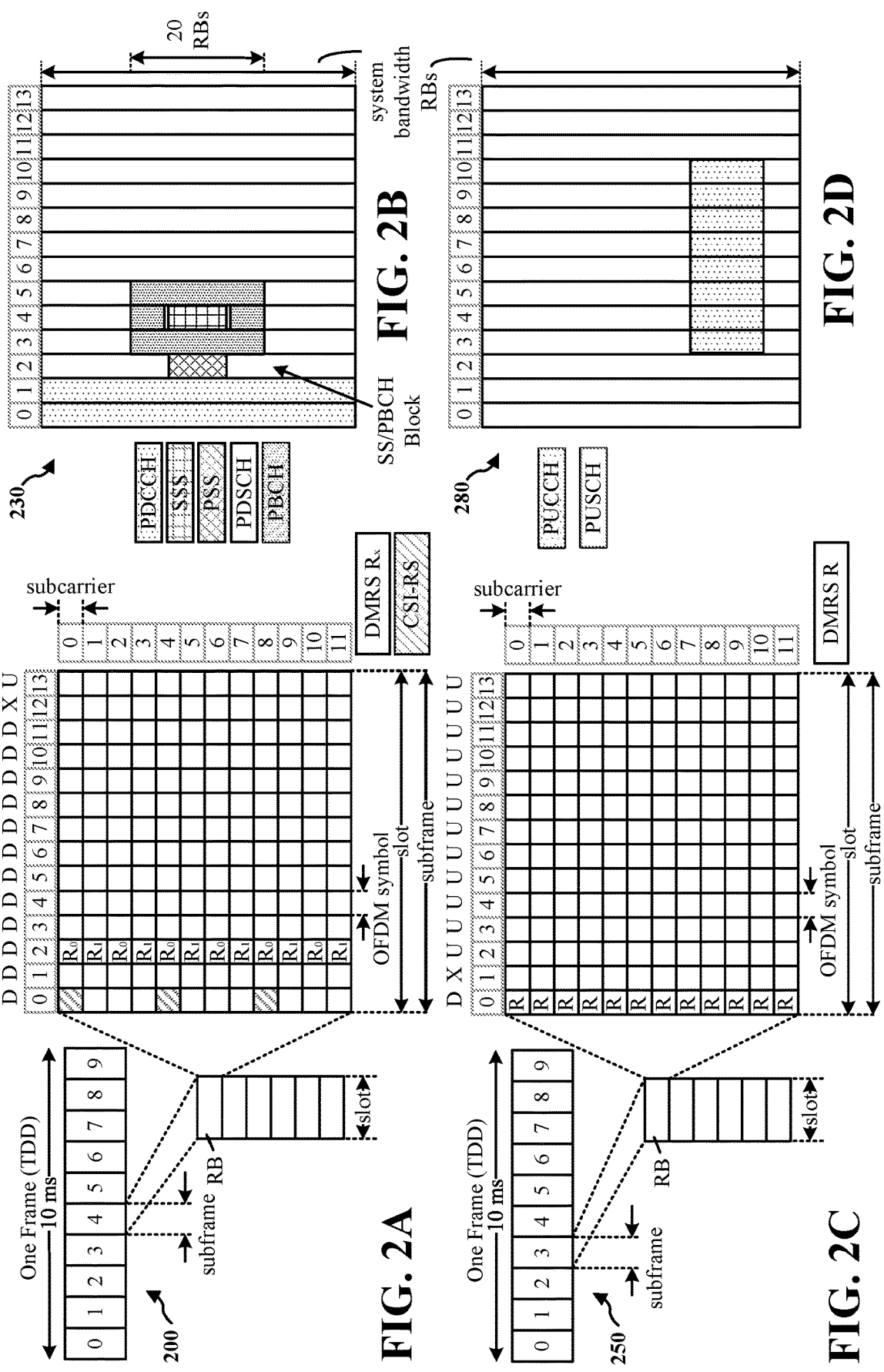
FIG. 2A is a diagram illustrating an example of a first frame, in accordance with certain aspects of the present description.
FIG. 2B is a diagram illustrating an example of downlink (DL) channels within a subframe, in accordance with certain aspects of the present description.
FIG. 2C is a diagram illustrating an example of a second frame, in accordance with certain aspects of the present description.
FIG. 2D is a diagram illustrating an example of uplink (UL) channels within a subframe, in accordance with certain aspects of the present description.

FIGS. 2A-2D are resource diagrams illustrating example frame structures and channels that may be used for uplink, downlink, and sidelink transmissions to a UE 104 including a CSI component 140. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/ symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIGs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
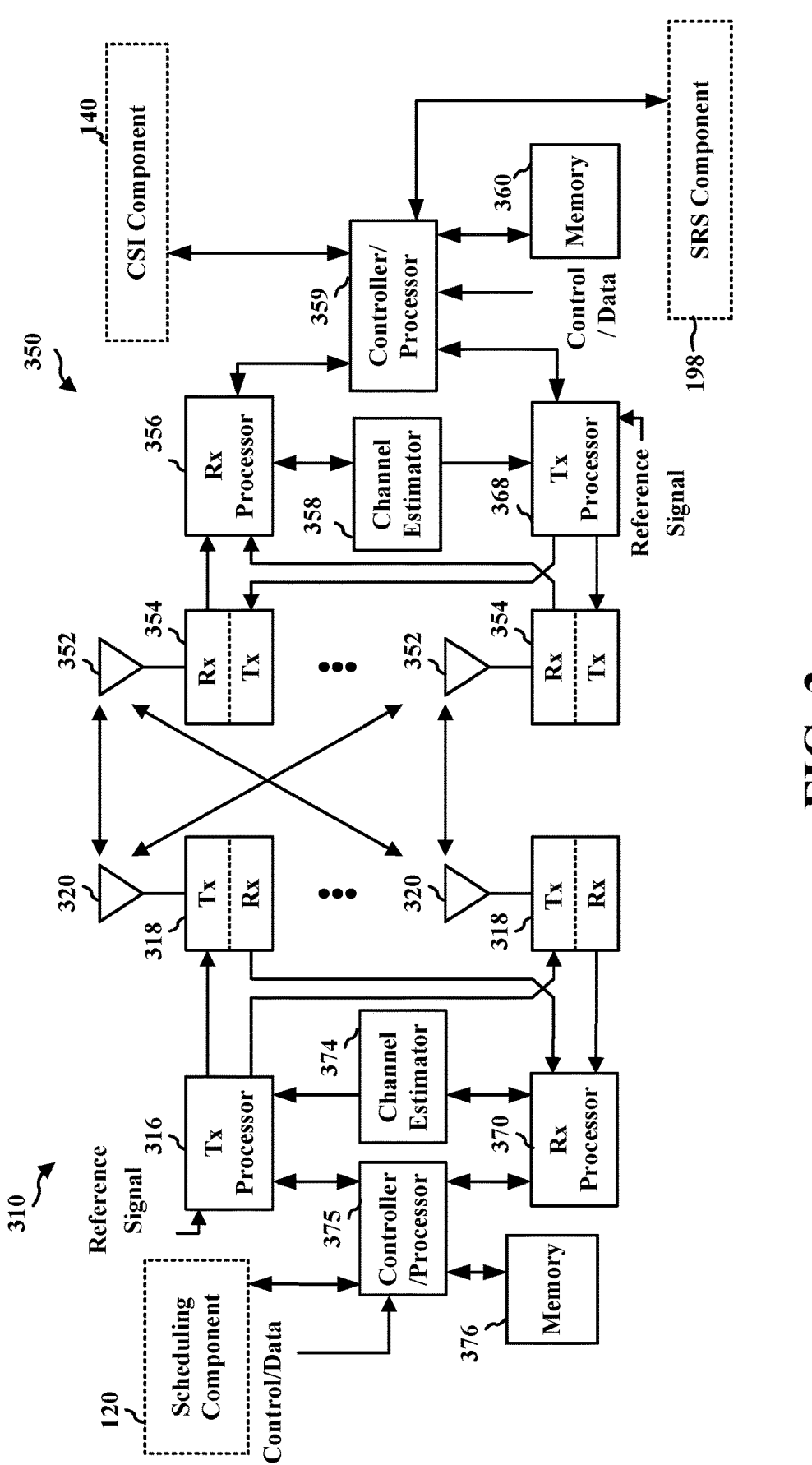
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate an RF carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160 or 5GC 190. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the CSI component 140 and/or the RS component 198 of FIG. 1. For example, the memory 360 may include executable instructions defining the CSI component 140 and/or the RS component 198. The TX processor 368, the RX processor 356, and/or the controller/processor 359 may be configured to execute the CSI component 140 and/or the RS component 198.

At least one of the Tx processor 316, the Rx processor 370, and the controller/processor 375 may be configured to perform aspects in connection with the scheduling component 120 of FIG. 1. For example, the memory 376 may include executable instructions defining the scheduling component 120. The TX processor 316, the RX processor 370, and/or the controller/processor 375 may be configured to execute the scheduling component 120.

FIGS. 4A-4D illustrate various modes of full-duplex communication. Full-duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full-duplex communication 400 in which a first base station 402a is in full duplex communication with a first UE 404a and a second UE 406a. The first base station 402a is a full-duplex base station, whereas the first UE 404a and the second UE 406a may be configured as either a half-duplex UE or a full-duplex UE. The second UE 406a may transmit a first uplink signal to the first base station 402a as well as to other base stations, such as a second base station 408a in proximity to the second UE 406a. The first base station 402a transmits a downlink signal to the first UE 404a concurrently with receiving the uplink signal from the second UE 406a. The base station 402a may experience self-interference at the receiving antenna that is receiving the uplink signal from UE 406a due to receiving some of the downlink signal being transmitted to the UE 404a. The base station 402a may experience additional interference due to signals from the second base station 408a. Interference may also occur at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the first base station 402b is a full-duplex base station and the first UE 404b is a full-duplex UE. The first base station 402b and the first UE 404b that can concurrently receive and transmit communication that overlaps in time in a same frequency band. The base station 402b and the UE 404b may each experience self-interference, in which a transmitted signal from the device is leaked to a receiver at the same device. The first UE 404b may experience additional interference based on one or more signals emitted from a second UE 406b and/or a second base station 408b in proximity to the first UE 404b. Additionally, the uplink transmissions from the first UE 404b may cause interference to the second UE 406b receiving downlink signals from the first base station 402b and/or the second base station 408b.

FIG. 4C shows a third example of full-duplex communication 420 in which a first UE 404c is a full-duplex UE in communication with a first base station 402c and a second base station 408c. The first base station 402c and the second base station 408c may serve as multiple transmission and reception points (multi-TRPs) for UL and DL communication with the UE 404c. The second base station 408c may be in communication with a second UE 406c. In FIG. 4C, the first UE 404c may concurrently transmit an uplink signal to the first base station 402c while receiving a downlink signal from the second base station 408c. The first UE 404c may experience self-interference as a result of the first signal and the second signal being communicated simultaneously, e.g., the uplink signal may leak to, e.g., be received by, the UE's receiver. The first UE 404c may experience additional interference from the second UE 406c. Additionally, the uplink transmissions from the first UE 404c may cause interference to the second UE 406c receiving downlink signals from the first base station 402c and/or the second base station 408c.

FIG. 4D shows a fourth example of full-duplex communication 430 in which one or more integrated access and backhaul (IAB) nodes 432a, 432b are a full-duplex devices in communication with an IAB parent node 434 and one or more UEs 404. Each full-duplex IAB node 432a, 432b may experience self-interference, for example, from downlink transmissions to the UEs 404 (e.g., UEs 404d, 404e, 404f, 404g) leaking into uplink signals from the UEs 404 or downlink signals from the IAB parent node 434. Additionally, a full-duplex IAB node 432a may experience interference from downlink transmission of the IAB node 432b to UEs 404 or uplink transmissions of the IAB node 432b to the parent IAB node 434.

Figure 5:
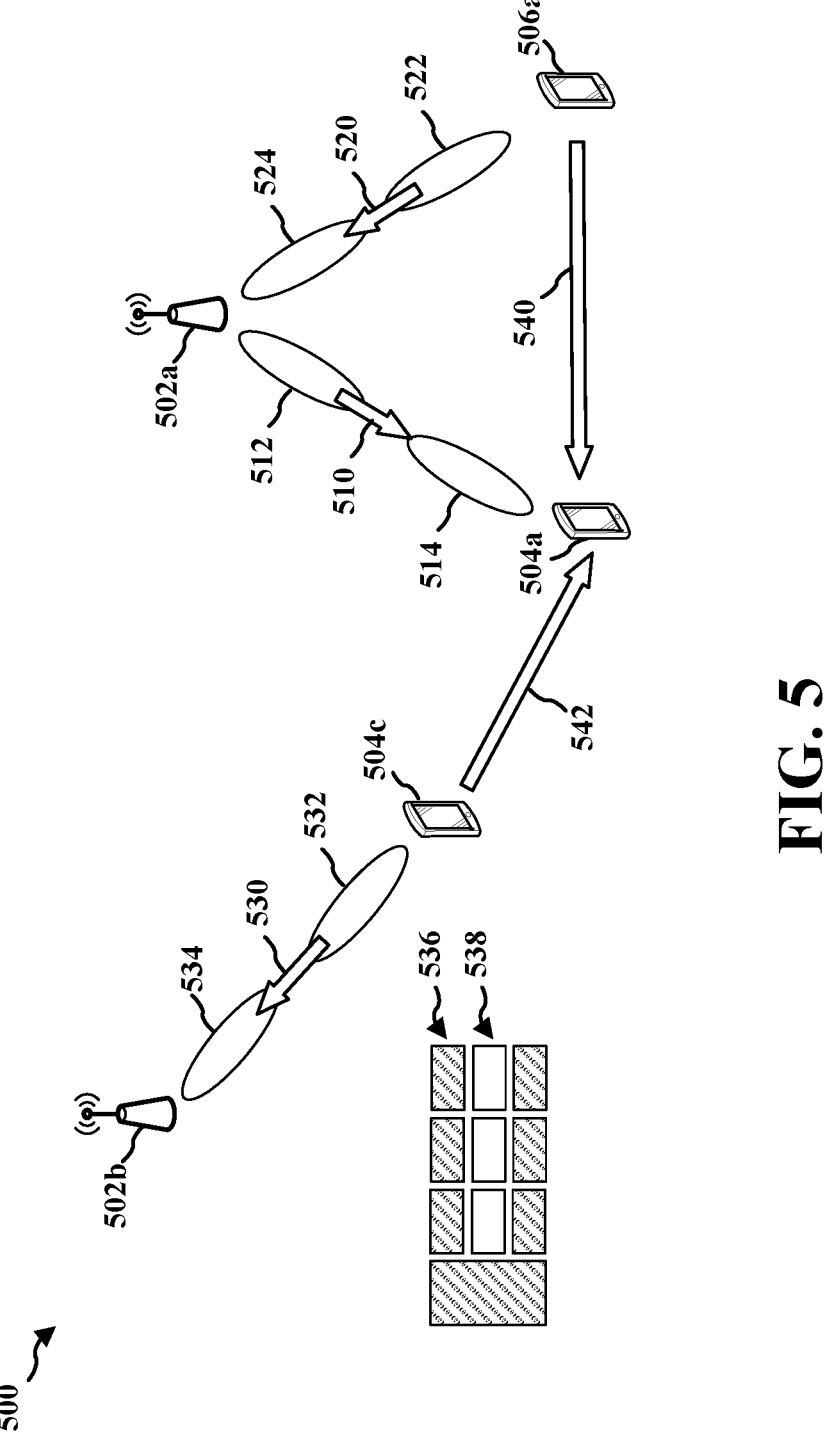
FIG. 5 illustrates an example of cross-link interference (CLI) measurement in the presence of full-duplex communication, in accordance with certain aspects of the present description.

FIG. 5 illustrates an example 500 of CLI measurement in the presence of full-duplex communication. For example, the base station 502a may be a full-duplex base station as in FIG. 4A and communicate with a first UE 504a, and a second UE 504b. The first UE 504a may receive a downlink signal 510 that is transmitted on a Tx beam 512 and received on a Rx beam 514. Concurrently, the second UE 506*a* may transmit an uplink signal 520 on a Tx beam 522, which is received by the base station 502*a* on a receive beam 524. The uplink signal 520 may cause CLI 540 to the downlink signal 510 at the first UE 504*a*, which may be referred to as a victim UE. A second base station 502*b* may be a sub-band full-duplex base station configured for downlink communication with third UE 504*c* on a downlink sub-band 536 and for uplink communication with the third UE 504*c* on an uplink sub-band 538. The third UE 504*c* may communicate with the second base station 502*b*, for example, transmitting an uplink signal 530 on the uplink sub-band 538 using a transmit beam 532 concurrently with the base station 502*a* transmitting the downlink signal 510. The second base station 502*b* may receive the uplink signal 530 on a receive beam 534. The uplink signal 530 may cause inter-sub-band inter-cell inter-UE CLI 542 to the UE 504*a*.

The UE 504*a* may be configured with interference measurement resources for measuring the CLI 540. For example, the interference measurement resources may correspond to an SRS or DMRS transmitted by the UE 504*b* and/or 504*c*. In some implementations, CLI measurements may not be directly reported. For instance, the effect on CLI on desired channels may be more important than a direct measurement of the CLI. In some implementations, one or more CSI reports may be configured for measurements of channels with and without CLI from different sources using CSI-RS) resource indicators (CRIs). A CRI may include a combination of a channel measurement resource (CMR) and interference measurement resource (IMR). For example, the UE 504*a* may be configured to report CSI for a CSI-RS (e.g., a CMR) corresponding to the downlink signal 510 without the CLI 540 (e.g., a first IMR) and with the CLI 540 (e.g., a second IMR). CSI for other sources of CLI such as UE 504*c* may be configured with a separate CRIs. When multiple UEs may potentially cause CLI, CSI reports based on measurements with CLI from each UE may be used to identify the effects of the CLI from each UE. CSI reporting techniques may be modified to improve efficiency of configuration and signaling when one or more sources of CLI may affect channel conditions.

Figure 6:
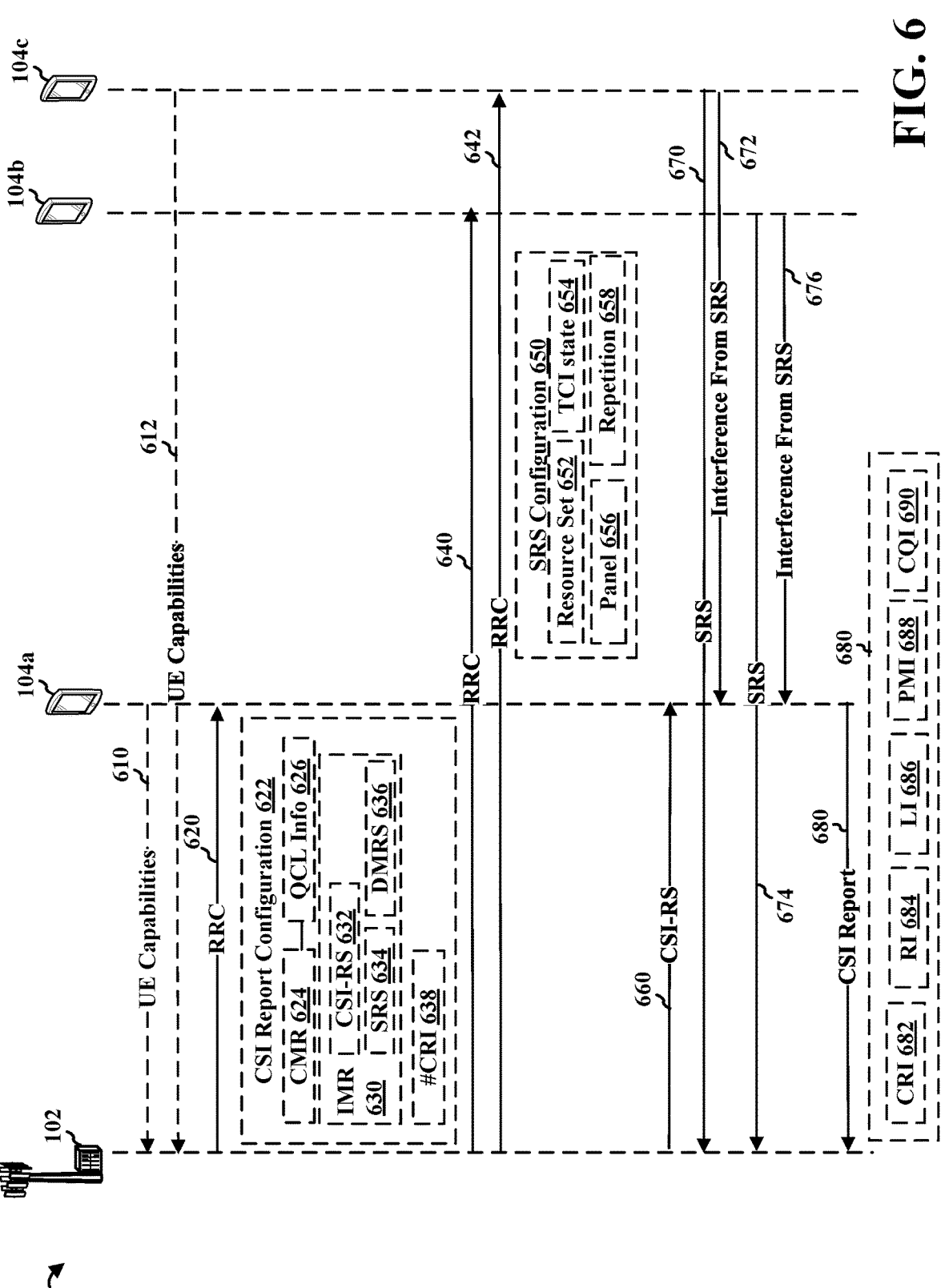
FIG. 6 is a message diagram illustrating example messages for CSI reporting considering multiple sources of CLI.

FIG. 6 is a message diagram 600 illustrating example messages for CSI reporting considering multiple sources of CLI. A base station 102 may be a serving base station for a victim UE 104*a* and one or more aggressor UEs 104*b*, 104*c*. Both the victim UE 104*a* and the aggressor UEs 104*b*, 104*c* may transmit UE capabilities 610, 612 indicating the respective capabilities of the UEs 104 with respect to CLI measurement and CSI reporting.

The base station 102 may configure the victim UE 104*a* via RRC signaling 620 with an CSI report configuration 622. For example, the CSI report configuration 622 may include a CMR 624. The CMR 624 may be associated with quasi-co-location (QCL) information 626. The CSI report configuration 622 may also include one or more IMRs 630. For example, the IMRs 630 may include a CSI-RS 632 of another cell (e.g., base station 502*b*) for measuring inter-cell interference. The IMRs 630 may include one or more uplink reference signals such as an SRS 634 or an uplink DMRS 636. For example, the CSI report configuration 622 may configure an IMR 630 for each aggressor UE 104*b*, 104*c*. In some implementations, the CSI report configuration 622 may define a plurality of CRIs, where each CRI is associated with a CMR 624 and an IMR 630. In some implementations, the CSI report configuration 622 may indicate a number of CRIs 638 to include in a CSI report.

The base station 102 may configure each aggressor UE 104*b*, 104*c* via RRC signaling 640, 642 with an SRS configuration 650. The SRS configuration 650 may indicate how the aggressor UE 104*b*, 104*c* should transmit an SRS to be used as an IMR 630 by the victim UE 104*a*. For instance, the SRS configuration 650 may include a resource set 652 that identifies one or more time domain resources (e.g., corresponding to SRS 634), a transmission configuration indicator (TCI) state 654 to use for the SRS transmission, a panel 656 for the transmission, and repetition parameter 658 that indicates how many times the SRS should be repeated.

The base station 102 may transmit a CSI-RS 660 to the victim UE 404*a*, for example, on the CMR 624. Each of the aggressor UEs 104*b*, 104*c* may transmit a respective SRS 670, 674 based on the SRS configuration 650. The victim UE 104*a* may receive the SRS 670, 674 as interference 672, 676. The victim UE 104*b* may measure the interference 672, 676 from the SRS 670, 674 on the respective measurement resources (e.g., IMR 630 and SRS 634). In some implementations, the UE 104*a* may concurrently measure the CSI-RS 660 and the interference 672, 676.

The victim UE 104*a* may generate a CSI report 680 based on the measurements of the CSI-RS 660, the interference metrics, and the CSI report configuration 622. For example, the CSI report 680 may identify a CRI 682, a rank indicator (RI) 684, a layer indicator (LI) 686, a precoding matrix indicator (PMI) 688, and a channel quality indicator (CQI) 690. In some implementations, the CSI report 680 may be for a single CRI 682, and any RI 684, LI 686, PMI 688, or CQI 690 may be for the single CRI 682. The victim UE 104*a* may transmit multiple CSI reports 680, each corresponding to a different CRI 682 to indicate the channel conditions under different types or sources of CLI.

Figure 7:
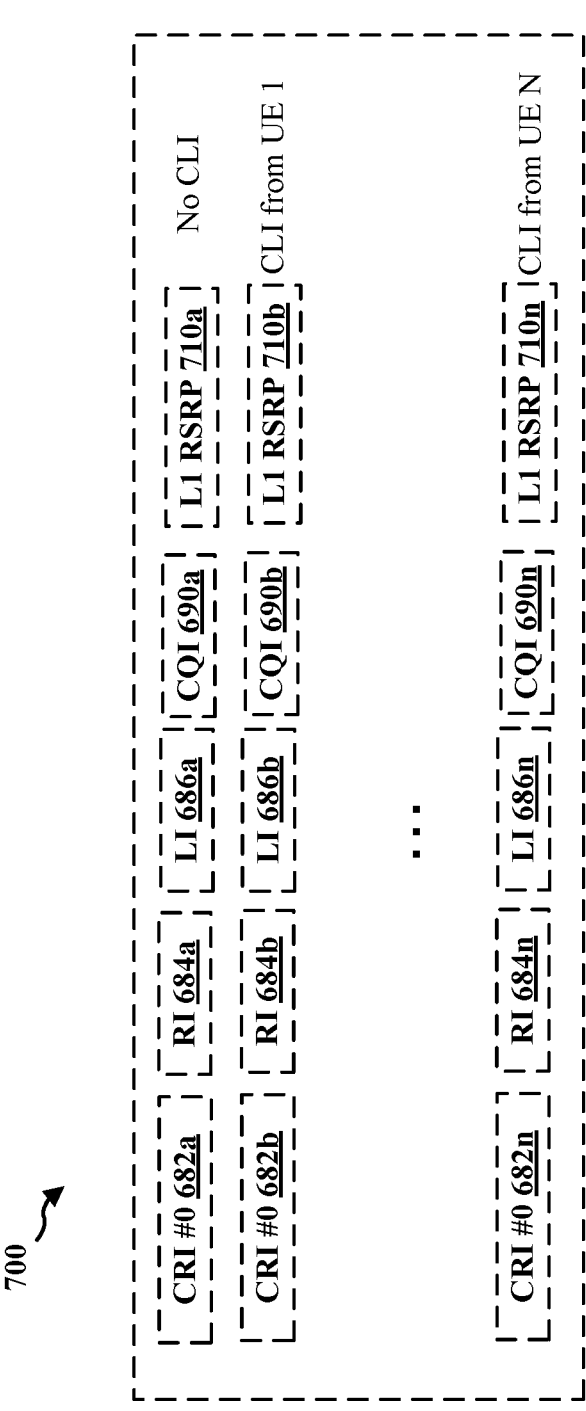
FIG. 7 is a diagram of an example CSI report for multiple-CRIs.

FIG. 7 is a diagram of an example CSI report 700 for multiple-CRIs. In an aspect, IMRs 630 for different UEs may result in a greater number of CRIs. Conventionally, a CSI report may only specify a single CRI. The CSI report 700 may include multiple CRIs 682*a*, 682*b*, 682*n* and one or more channel characteristics (e.g., RI 684*a-n*, LI 686*a-n*, or CQI 690*a-n*) for each CRI. In some implementations, PMI 678 may be the same for all CRIs. In some implementations, the CSI report 700 includes a layer 1 (L1) signal to interference plus noise ratio (SINR) 710 for each CRI 682.

In some implementations, the CSI report configuration 622 may indicate the number of CRIs 638 to include in the CSI report 700. For example, the CSI report configuration 622 may configure a CRI corresponding to each UE 104 that may cause CLI, but may request a smaller number of CRIs 638 in the CSI report 700. The victim UE 104*a* may select the CRIs to include in the CSI report 700, for example, based on a ranking of the channel characteristics for each of the CRIs. For instance, the UE 104*a* may report the number of CRIs 638 with the best CQI, the worst CQI, or a greatest difference in CQI, RI, or LI from a first CRI 682*a* with no CLI.

In some implementations, the CSI report 700 may include a measured value of the channel characteristic for the first CRI 682*a*. The channel characteristic for each subsequent CRI 682*b-n* may be an indication of a difference of the channel characteristic from the corresponding channel characteristic for the first CRI 682*a*. For example, a differential CQI 690*b* may be indicated using fewer bits than the full value for the CQI 690*a*. Accordingly, overhead of the CSI report 700 may be reduced by including differential channel characteristics for subsequent CRIs 682*b-n*.

Figure 8:
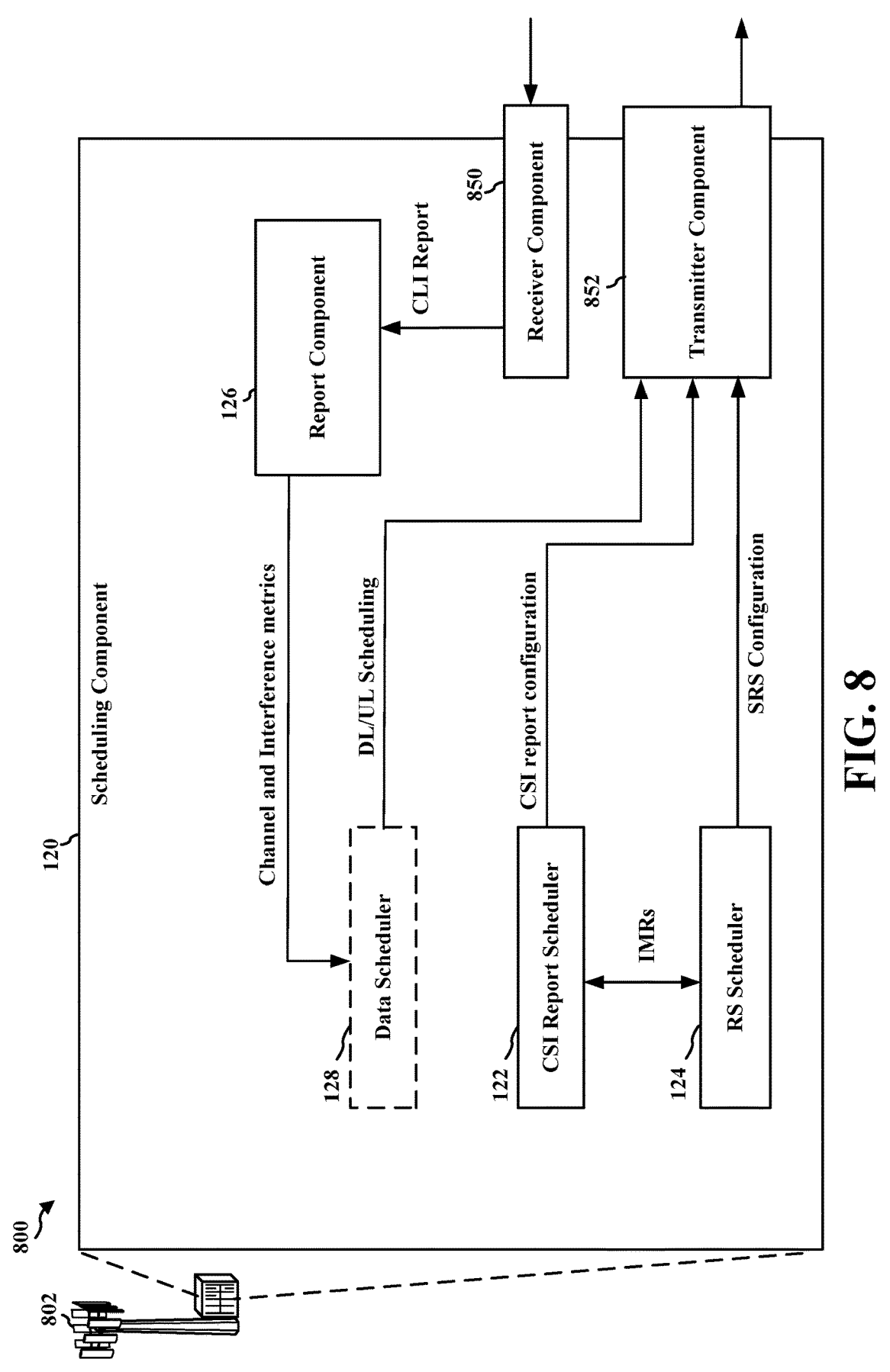
FIG. 8 is a conceptual data flow diagram illustrating the data flow between different means/components in an example BS, in accordance with certain aspects of the present description.

FIG. 8 is a conceptual data flow diagram 800 illustrating the data flow between different means/components in an example base station 802, which may be an example of the base station 102 including the scheduling component 120. The scheduling component 120 includes the CSI report scheduler 122, the RS scheduler 124, and the report receiving component 126. The scheduling component 120 may optionally include a data scheduler 128.

The base station 802 may include a receiver component 850 and a transmitter component 852. The receiver component 850 may include, for example, a RF receiver for receiving the signals described herein. The transmitter component 852 may include for example, an RF transmitter for transmitting the signals described herein. In some implementations, the receiver component 850 and the transmitter component 852 may be co-located in a transceiver such as the Tx/Rx 318 in FIG. 3.

The receiver component 850 may receive uplink signals from multiple UEs 104. For example, the receiver component 850 may receive UE capabilities 610, 612, an SRS 670, 674 from the aggressor UE 104b, and a CSI report 680, 700 from the victim UE 104b. The receiver component 850 may provide the CSI report 680, 700 to the report receiving component 126.

The CSI report scheduler 122 may configure the one or more victim UEs to transmit a configuration of a CSI report to a first UE 104a. The configuration includes an indication of a SRS or uplink DMRS of a second UE as an interference measurement resource (IMR). In some implementations, the CSI report scheduler 122 may receive an indication of SRS or DMRS scheduling from the RS scheduler 124. The CSI report scheduler 122 may configure the one or more victim UEs with IMRs corresponding to the SRS or DMRS scheduled for an aggressor UE 104b, 104c. In some implementations, the CSI report scheduler 122 may select IMRs for measurement based on the schedule of the first UE 104a. For example, the CSI scheduler 122 may determine how often the first UE 104a should report CSI and select IMRs based on the periodicity of the CSI report. The CSI report scheduler 122 may output the scheduled IMRs to the RS scheduler 124. The CSI report scheduler 122 may generate the CSI report configuration 622 including the IMRs 630. The CSI report scheduler 122 may output the CSI report configuration 622 for transmission via the transmitter component 852.

The RS scheduler 124 may be configured to schedule the second UE to transmit the sounding reference signal or the uplink demodulation reference signal on the IMR. For example, the RS scheduler 124 may obtain the IMR from the CSI report scheduler 122. The RS scheduler 124 may generate the SRS configuration 632 for a second UE 104b based on the IMRs. For example, the RS scheduler 124 may add the IMR 630 for an SRS 634 or DMRS 636 to the resource set 652. The RS scheduler 124 may output the SRS configuration 632 for transmission via the transmitter component 852.

The report receiving component 126 is configured to receive the CSI report 680, 700 from the first UE. The CSI report 680 includes at least one channel characteristic and the at least one channel characteristic takes into account cross-link interference of the second UE 104b to the first UE 104a. The at least one channel characteristic includes one or more of the L1 SINR 710, the CQI 690, the PMI 688, the RI 684, or the LI 686. In some implementations, the report receiving component 126 may determine cross-link interference experienced by the first UE 104a. For example, the report receiving component 126 may compare a first CQI 690a with a subsequent CQI 690b to estimate a CLI from the second UE 104b. In some implementations, the report receiving component 126 may output channel conditions and interference metrics to the data scheduler 128.

The optional data scheduler 128 may be configured to schedule a downlink transmission to the first UE 104a or an uplink transmission from the second UE 104b based at least in part on the CSI report from the first UE. For example, the data scheduler 128 may obtain the channel conditions and interference metrics from the report receiving component 126. The data scheduler 128 may identify a number of resources for transmitting data from a queue (not shown) at the base station 102 to the first UE 104a and/or a number of resources for the second UE 104b to transmit data based on the channel conditions. The data scheduler 128 may determine other transmission properties such modulation and coding scheme (MCS), TCI state, and MIMO properties. The data scheduler 128 may generate scheduling information such as a downlink control information (DCI), semi-persistent scheduling (SPS), or configured grant (CG) to carry the transmission properties. The data scheduler 128 may output the DL or UL scheduling information for transmission via the transmitter component 852.

Figure 9:
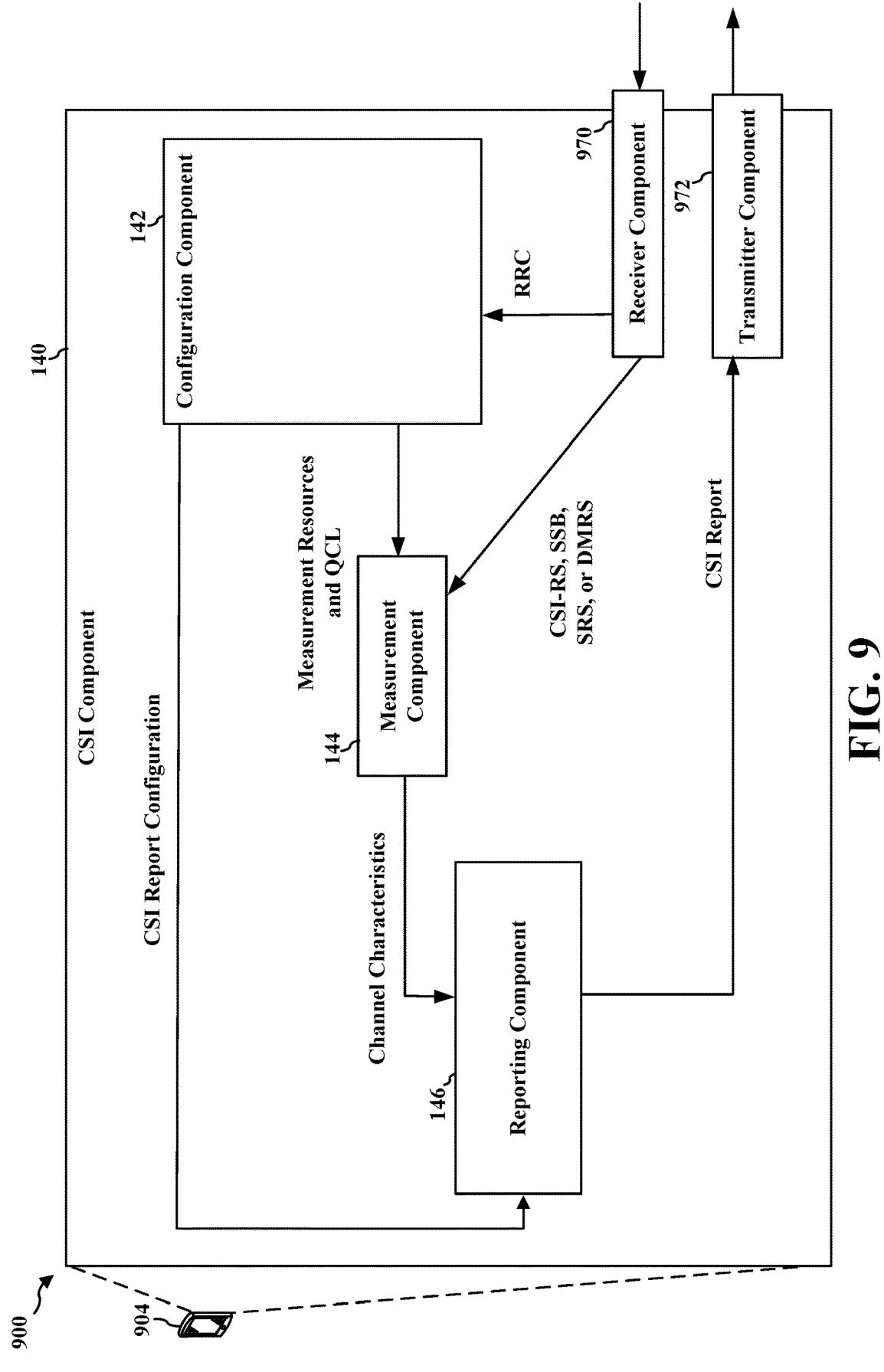
FIG. 9 is a conceptual data flow diagram illustrating the data flow between different means/components in an example victim UE, in accordance with certain aspects of the present description.

FIG. 9 is a conceptual data flow diagram 900 illustrating the data flow between different means/components in an example UE 904, which may be an example of the UE 104 (e.g., victim UE 104a) and include the CSI component 140.

As discussed with respect to FIG. 1, the CSI component 140 may include the configuration component 142, the measurement component 144, and the reporting component 146. The UE 104 also may include a receiver component 970 and a transmitter component 972. The receiver component 970 may include, for example, a RF receiver for receiving the signals described herein. The transmitter component 972 may include for example, an RF transmitter for transmitting the signals described herein. In some implementations, the receiver component 970 and the transmitter component 972 may be co-located in a transceiver.

The receiver component 970 may receive downlink signals such as the RRC signaling 620, the CSI report configuration 622, and the CSI-RS 660. The receiver component 970 may receive cross-link interference such as interference 672, 676 from the SRS 670, 674. The receiver component 970 may provide the RRC signaling 620 to the configuration component 142. The receiver component 970 may provide the CSI-RS 660 and the SRS 670, 674 to the measurement component 144.

The configuration component 142 is configured to receive a configuration of CSI report. The configuration component 142 may receive the RRC signaling 620 via the receiver component 970. The configuration component 142 may extract the CSI report configuration 622 from the RRC signaling 620, for example, by decoding the RRC signaling. For example, the configuration component 142 may extract parameters of the CSI report configuration 1062232 such as the CMR 624, QCL information 626, IMRs 630, and/or number of CRIs 638. In some implementations, the parameters may define a rule for which CRIs to report such as the CRIs associated with the best or worst channel characteristics. The parameters may also define the CSI channel characteristics to report such as L1 RSRP 710, RI 684, LI 686, PMI 688, or CQI 690. The configuration component 142 may provide the CLI report configuration parameters to the reporting component 146. The configuration component 142 may determine the resources to measure (e.g., CMR 624 and IMR 630) and the beams corresponding to the QCL information 626. In some implementations, the configuration component 142 may determine a panel to use for each measurement resource. The configuration component 142 may provide the measurement resources, associated beams, and/or panels to the measurement component 144.

The measurement component 144 is configured to measure the IMR to determine a cross-link interference of the second UE. The measurement component 144 may receive the measurement resources, QCL information, and/or panels from the configuration component 142. The measurement component 144 may perform measurements on the measurement resources. For example, the measurement component 144 may receive the CSI-RS 660 (or an SSB) on the CMR 624 via the receiver component 970. The measurement component 144 may receive the SRS 670, 674 (or an uplink DMRS) on the IMR 630 via the receiver component 970. In an aspect, the measurement component 144 may measure a L1 RSSI to capture the amount of CLI of the second UE. In some implementations, the measurement component 144 may measure an L1 RSRP to determine the CLI from a specific aggressor UE 104b. The measurement component 144 may determine the CSI channel characteristics based on the CSI-RS 660 taking into account the CLI. The measurement component 144 may provide CSI channel characteristics to the reporting component 146.

The reporting component 146 may transmit a CSI report 680, 700 based on the CSI report configuration 622 and the channel characteristics. In some implementations, the reporting component 146 may select the number of the CRIs to report based on a ranking of the at least one channel characteristic for each of the CRIs. For example, the reporting component 146 may determine a subset of the channel characteristics associated with reported measurement resources or CRIs. For example, the subset may include the number of CRIs 638 of the best CQIs 690. The reporting component 146 may determine the information to include for each measurement resource such as the CRI 682 and the corresponding channel characteristics. The reporting component 146 may determine uplink resources for the CSI report based on the CSI report configuration. The reporting component 146 may output the CSI report for transmission via the transmitter component 972.

FIG. 10 is a flowchart of an example method 1000 for a first UE to report CSI that takes into account cross-link interference of a second UE. The method 1000 may be performed by a UE (such as the UE 104, which may include the memory 360 and which may be the entire UE 104 or a component of the UE 104 such as the CSI component 140, Tx processor 368, the Rx processor 356, or the controller/processor 359). The method 1000 may be performed by the CSI component 140 in communication with the scheduling component 120 of the base station 102 and/or the SRS component 198 of the aggressor UE 104b. Optional blocks are shown with dashed lines.

At block 1010, the method 1000 includes receiving a configuration of a CSI report, the configuration including an indication of a sounding reference signal or uplink demodulation reference signal transmitted from a second UE as an IMR. In some implementations, for example, the UE 104, the Rx processor 356, or the controller/processor 359 may execute the CSI component 140 or the configuration component 142 to receive the CSI report configuration 622, the CSI report configuration 622 including an indication of a sounding reference signal (e.g., SRS 634) or uplink demodulation reference signal (e.g., DMRS 636) transmitted from a second UE 104b as an IMR 630. In some implementations (e.g., where the CSI report configuration 622 configures the CSI report 700), the configuration of the CSI report indicates the CMR 624 and a respective IMR 630 for each of a plurality of configured CRIs 682. In some implementations, the configuration indicates a number of the CRIs to report. Accordingly, the UE 104, the Rx processor 356, or the controller/processor 359 executing the CSI component 140 or the configuration component 142 may provide means for receiving a configuration of a CSI report, the configuration including an indication of a sounding reference signal or uplink demodulation reference signal transmitted from a second UE as an IMR.

At block 1020, the method 1000 includes measuring the IMR to determine a cross-link interference of the second UE to the first UE. In some implementations, for example, the UE 104, the Rx processor 356, or the controller/processor 359 may execute the CSI component 140 or the measurement component 144 to measure the IMR 630 to determine a cross-link interference of the second UE 104b to the first UE 104a. In some implementations, a QCL assumption for measuring the IMR is the same as a QCL assumption (e.g., QCL information 626) for CMR 624 for the CSI report. Accordingly, the UE 104, the Rx processor 356, or the controller/processor 359 executing the CSI component 140 or measurement component 144 may provide means for measuring the IMR to determine a cross-link interference of the second UE to the first UE.

At block 1030, the method 1000 may optionally include selecting the number of the CRIs to report based on a ranking of the at least one channel characteristic for each of the CRIs. In some implementations, for example, the UE 104, the Tx processor 368, or the controller/processor 359 may execute the CSI component 140 or the reporting component 146 to select the number of the CRIs 638 to report based on a ranking of the at least one channel characteristic for each of the CRIs. For example, the selected number of CRIs to report may include a set of CRIs with best channel characteristics or a set of CRIs with worst channel characteristics. Accordingly, the UE 104, the Tx processor 368, or the controller/processor 359 executing the CSI component 140 or the reporting component 146 may provide means for selecting the number of the CRIs to report based on a ranking of the at least one channel characteristic for each of the CRIs.

At block 1040, the method 1000 may include transmitting the CSI report. The CSI report includes at least one channel characteristic, the at least one channel characteristic takes into account the cross-link interference of the second UE. In some implementations, for example, the UE 104, the Tx processor 368, or the controller/processor 359 may execute the CSI component 140 or the reporting component 146 to transmit the CSI report 680, 700. The CSI report 680, 700 includes at least one channel characteristic, the at least one channel characteristic takes into account the cross-link interference of the second UE 104b. For example, the at least one channel characteristic may include one or more of a L1 SINR, a CQI, a PMI, a RI, or a LI. In some implementations, the CSI report 700 includes information for a plurality of CRIs 682, each CRI 682 associated with a same CMR 624 and a different IMR 630 corresponding to a different second UE 104b, 104c. In some such implementations, one of the CRIs 682a is associated with the same CMR and an IMR corresponding to downlink interference without cross-link interference transmitted by the second UE 104b. In some implementations, in the CSI report 700 the information for a subsequent CRI 682b includes an indication of a difference of the at least one channel characteristic from the at least one channel characteristic for a first CRI 682a. Accordingly, the UE 104, the Tx processor 368, or the controller/processor

359 executing the CSI component 140 or the reporting component 146 may provide means for transmitting the CSI report.

FIG. 11 a flowchart of an example method 1100 for a base station to configure a first UE to report CSI taking into account CLI from a second UE. The method 1100 may be performed by a base station (such as the base station 102, which may include the memory 376 and which may be the entire base station 102 or a component of the base station 102 such as the scheduling component 120, Tx processor 316, the Rx processor 370, or the controller/processor 375). The method 1100 may be performed by the scheduling component 120 in communication with the CSI component 140 of the first UE 104a and the SRS component 198 of the second UE 104b.

At block 1110, the method 1100 includes transmitting a configuration of a CSI report to a first UE, the configuration including an indication of a sounding reference signal or uplink demodulation reference signal transmitted from a second UE as an IMR. In some implementations, for example, the base station 102, Tx processor 316, or the controller/processor 375 may execute the scheduling component 120 or the CSI report scheduler 122 to transmit the CSI report configuration 622 to the first UE 104a, the CSI report configuration 622 including an indication of a sounding reference signal (e.g., SRS 634) or uplink demodulation reference signal (e.g., DMRS 636) transmitted from a second UE 104b as an IMR 630. In some implementations, a QCL assumption for measuring the IMR 630 is the same as a QCL assumption for a CMR 624 for the CSI report. In some implementations, the configuration indicates a number of the CRIs 638 to report. Accordingly, the base station 102, Tx processor 316, or the controller/processor 375 executing the scheduling component 120 or the CSI report scheduler 122 may provide means for transmitting a configuration of a CSI report to a first UE, the configuration including an indication of a sounding reference signal or uplink demodulation reference signal transmitted from a second UE as an IMR.

At block 1120, the method 1100 includes scheduling the second UE to transmit the sounding reference signal or the uplink demodulation reference signal on the IMR. In some implementations, for example, the base station 102, Tx processor 316, or the controller/processor 375 may execute the scheduling component 120 or the RS scheduler 124 to schedule the second UE to transmit the sounding reference signal or the uplink demodulation reference signal on the IMR 630. For example, the RS scheduler 124 may transmit, to one or more second UEs 104b, 104c, an SRS configuration 632 corresponding to the IMRs 630 of the first UE 104b. Accordingly, the base station 102, Tx processor 316, or the controller/processor 375 executing the scheduling component 120 or the RS scheduler 124 may provide means for scheduling the second UE to transmit the sounding reference signal or the uplink demodulation reference signal on the IMR.

At block 1130, the method 1100 includes receiving the CSI report from the first UE, wherein the CSI report includes at least one channel characteristic and the at least one channel characteristic takes into account cross-link interference of the second UE to the first UE. In some implementations, for example, the base station 102, Rx processor 370, or the controller/processor 375 may execute the scheduling component 120 or the report receiving component 126 to receive the CSI report 680, 700 from the first UE 104b. The CSI report 680, 700 includes at least one channel characteristic and the at least one channel characteristic takes into account cross-link interference 676 of the second UE 104b to the first UE 104a. For example, the at least one channel characteristic may include one or more of a L1 SINR, a CQI, a PMI, a RI, or a LI. In some implementations, the CSI report 700 includes information for a plurality of CRIs 682, each CRI 682 associated with a same CMR 624 and a different IMR 630 corresponding to a different second UE 104b, 104c. In some such implementations, one of the CRIs 682a is associated with the same CMR and an IMR corresponding to downlink interference without cross-link interference transmitted by the second UE 104b. In some implementations, in the CSI report 700 the information for a subsequent CRI 682b includes an indication of a difference of the at least one channel characteristic from the at least one channel characteristic for a first CRI 682a. In some implementations, the CSI report includes the number of the CRIs to report as a set of CRIs with best channel characteristics or a set of CRIs with worst channel characteristics Accordingly, the base station 102, Rx processor 370, or the controller/processor 375 executing the scheduling component 120 or the report receiving component 126 may provide means for receiving the CSI report from the first UE.

At block 1140, the method 1100 may optionally include scheduling a downlink transmission to the first UE or an uplink transmission from the second UE based at least in part on the CSI report from the first UE. In some implementations, for example, the base station 102, Tx processor 316, or the controller/processor 375 may execute the scheduling component 120 or the data scheduler 128 to schedule the downlink transmission to the first UE 104a or an uplink transmission from the second UE 104b based at least in part on the CSI report 680, 700 from the first UE. For example, the data scheduler 128 may transmit a DCI, SPS configuration, or CG configuration. Accordingly, the base station 102, Tx processor 316, or the controller/processor 375 executing the scheduling component 120 or the RS scheduler 124 may provide means for scheduling a downlink transmission to the first UE or an uplink transmission from the second UE based at least in part on the CSI report from the first UE.

The following provides an overview of aspects of the present disclosure:

Aspect 1: A method of wireless communications at a first user equipment (UE) comprising: receiving a configuration of a channel state information (CSI) report, the configuration including an indication of a sounding reference signal or uplink demodulation reference signal transmitted by a second UE as an interference measurement resource (IMR); measuring the IMR to determine a cross-link interference of the second UE to the first UE; and transmitting the CSI report, wherein the CSI report includes at least one channel characteristic, the at least one channel characteristic takes into account the cross-link interference of the second UE.

Aspect 2: The method of Aspect 1, wherein a quasi-co-location (QCL) assumption for measuring the IMR is the same as a QCL assumption for a channel measurement resource (CMR) for the CSI report.

Aspect 3: The method of Aspect 1 or 2, wherein the at least one channel characteristic includes one or more of a layer 1 (L1) signal to interference plus noise ratio (SINR), a channel quality indicator (CQI), a precoding matrix indicator (PMI), a rank indicator (RI), or a layer indicator (LI).

Aspect 4: The method of any of Aspects 1-3, wherein the CSI report comprises information for a plurality of CSI reference signal (CSI-RS) resource indicators (CRIs), each CRI associated with a same channel measurement resource (CMR) and a different IMR corresponding to a different second UE.

Aspect 5: The method of Aspect 4, wherein the configuration of the CSI report indicates the CMR and a respective IMR for each of a plurality of configured CRIs.

Aspect 6: The method of Aspect 4 or 5, wherein one of the CRIs is associated with the same CMR and an IMR corresponding to downlink interference without cross-link interference transmitted by the second UE.

Aspect 7: The method of any of Aspects 4-6, wherein the information for a subsequent CRI includes an indication of a difference of the at least one channel characteristic from the at least one channel characteristic for a first CRI.

Aspect 8: The method of any of Aspects 4-7, wherein the configuration indicates a number of the CRIs to report.

Aspect 9: The method of Aspect 8, further comprising selecting the number of the CRIs to report based on a ranking of the at least one channel characteristic for each of the CRIs.

Aspect 10: The method of Aspect 9, wherein the selected number of CRIs to report includes a set of CRIs with best channel characteristics or a set of CRIs with worst channel characteristics.

Aspect 11: A method of wireless communications at a base station, comprising: transmitting a configuration of a channel state information (CSI) report to a first user equipment (UE), the configuration including an indication of a sounding reference signal or uplink demodulation reference signal transmitted by a second UE as an interference measurement resource (IMR); scheduling the second UE to transmit the sounding reference signal or the uplink demodulation reference signal on the IMR; and receiving the CSI report from the first UE, wherein the CSI report includes at least one channel characteristic and the at least one channel characteristic takes into account cross-link interference of the second UE to the first UE.

Aspect 12: The method of Aspect 11, wherein a quasi-co-location (QCL) assumption for measuring the IMR is the same as a QCL assumption for a channel measurement resource (CMR) for the CSI report.

Aspect 13: The method of Aspect 11 or 12, wherein the at least one channel characteristic includes one or more of a layer 1 (L1) signal to interference plus noise ratio (SINR), a channel quality indicator (CQI), a precoding matrix indicator (PMI), a rank indicator (RI), or a layer indicator (LI).

Aspect 14: The method of any of Aspects 11-13, wherein the CSI report comprises information for a plurality of CSI reference signal (CSI-RS) resource indicators (CRIs), each CRI associated with a same channel measurement resource (CMR) and a different IMR corresponding to a different second UE.

Aspect 15: The method of Aspect 14, wherein one of the CRIs is associated with the same CMR and an IMR corresponding to downlink interference without cross-link interference transmitted by the second UE.

Aspect 16: The method of Aspect 14 or 15, wherein the information for a subsequent CRI includes an indication of a difference of the at least one channel characteristic from the at least one channel characteristic for a first CRI.

Aspect 17: The method of any of Aspects 14-16, wherein the configuration indicates a number of the CRIs to report.

Aspect 18: The method of Aspect 17, wherein the CSI report includes the number of the CRIs to report as a set of CRIs with best channel characteristics or a set of CRIs with worst channel characteristics.

Aspect 19: The method of any of Aspects 11-19, further comprising scheduling a downlink transmission to the first UE or an uplink transmission from the second UE based at least in part on the CSI report from the first UE.

Aspect 20: An apparatus for wireless communication at a UE, comprising: a transceiver; a memory storing computer-executable instructions; and a processor coupled with the transceiver and the memory and configured to execute the computer-executable instructions to perform the method of any of Aspects 1-9.

Aspect 21: An apparatus for wireless communication at a base station, comprising: a transceiver; a memory storing computer-executable instructions; and a processor coupled with the transceiver and the memory and configured to execute the computer-executable instructions to perform the method of any of Aspects 10-19.

Aspect 22: An apparatus for wireless communication, comprising: means for performing the method of any of Aspects 1-9.

Aspect 23: An apparatus for wireless communication, comprising: means for performing the method of any of Aspects 10-19.

Aspect 24: A non-transitory computer-readable medium storing computer executable code, the code when executed by a processor causes the processor to perform the method of any of Aspects 1-9.

Aspect 25: A non-transitory computer-readable medium storing computer executable code, the code when executed by a processor causes the processor to perform the method of any of Aspects 10-19.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communications at a first user equipment (UE) comprising:

a transceiver;

a memory storing computer-executable instructions; and a processor coupled with the transceiver and the memory and configured to execute the instructions to cause the apparatus to:

receive a configuration of a channel state information (CSI) report, the configuration including an indication of a sounding reference signal or uplink demodulation reference signal transmitted from a second UE as an interference measurement resource (IMR);

measure the IMR to determine a cross-link interference of the second UE to the first UE; and transmit the CSI report, wherein the CSI report includes at least one channel characteristic, the at least one channel characteristic takes into account the cross-link interference of the second UE, wherein the CSI report comprises information for a plurality of CSI reference signal (CSI-RS) resource indicators (CRIs), each CRI associated with a same channel measurement resource (CMR) and a different IMR corresponding to a different second UE, and wherein the configuration indicates a number of the CRIs to report.

2. The apparatus of claim 1, wherein a quasi-co-location (QCL) assumption for measuring the IMR is the same as a QCL assumption for a channel measurement resource (CMR) for the CSI report.

3. The apparatus of claim 1, wherein the at least one channel characteristic includes one or more of a layer 1 (L1) signal to interference plus noise ratio (SINR), a channel quality indicator (CQI), a precoding matrix indicator (PMI), a rank indicator (RI), or a layer indicator (LI).

4. The apparatus of claim 1, wherein the configuration of the CSI report indicates the CMR and a respective IMR for each of a plurality of configured CRIs.

5. The apparatus of claim 1, wherein one of the CRIs is associated with the same CMR and an IMR corresponding to downlink interference without cross-link interference transmitted by the second UE.

6. The apparatus of claim 1, wherein the information for a subsequent CRI includes an indication of a difference of the at least one channel characteristic from the at least one channel characteristic for a first CRI.

7. The apparatus of claim 1, wherein the processor is configured to cause the apparatus to select the number of the CRIs to report based on a ranking of the at least one channel characteristic for each of the CRIs.

8. The apparatus of claim 7, wherein the selected number of CRIs to report includes a set of CRIs with best channel characteristics or a set of CRIs with worst channel characteristics.

9. An apparatus for wireless communications at a base station, comprising:

a transceiver;

a memory storing computer-executable instructions; and a processor coupled with the transceiver and the memory and configured to execute the instructions to cause the apparatus to:

transmit a configuration of a channel state information (CSI) report to a first user equipment (UE), the configuration including an indication of a sounding reference signal or uplink demodulation reference signal transmitted by a second UE as an interference measurement resource (IMR);

schedule the second UE to transmit the sounding reference signal or the uplink demodulation reference signal on the IMR; and receive the CSI report from the first UE, wherein the CSI report includes at least one channel characteristic and the at least one channel characteristic takes into account cross-link interference of the second UE to the first UE, wherein the CSI report comprises information for a plurality of CSI reference signal (CSI-RS) resource indicators (CRIs), each CRI associated with a same channel measurement resource (CMR) and a different IMR corresponding to a different second UE, and wherein the configuration indicates a number of the CRIs to report.

10. The apparatus of claim 9, wherein a quasi-co-location (QCL) assumption for measuring the IMR is the same as a QCL assumption for a channel measurement resource (CMR) for the CSI report.

11. The apparatus of claim 9, wherein the at least one channel characteristic includes one or more of a layer 1 (L1) signal to interference plus noise ratio (SINR), a channel quality indicator (CQI), a precoding matrix indicator (PMI), a rank indicator (RI), or a layer indicator (LI).

12. The apparatus of claim 9, wherein one of the CRIs is associated with the same CMR and an IMR corresponding to downlink interference without cross-link interference transmitted by the second UE.

13. The apparatus of claim 9, wherein the information for a subsequent CRI includes an indication of a difference of the at least one channel characteristic from the at least one channel characteristic for a first CRI.

14. The apparatus of claim 9, wherein the CSI report includes the number of the CRIs to report as a set of CRIs with best channel characteristics or a set of CRIs with worst channel characteristics.

15. The apparatus of claim 9, wherein the at least one processor is further configured to execute the instructions to schedule a downlink transmission to the first UE or an uplink transmission from the second UE based at least in part on the CSI report from the first UE.

16. A method of wireless communications at a first user equipment (UE) comprising:

receiving a configuration of a channel state information (CSI) report, the configuration including an indication of a sounding reference signal or uplink demodulation reference signal transmitted by a second UE as an interference measurement resource (IMR);

measuring the IMR to determine a cross-link interference of the second UE to the first UE; and transmitting the CSI report, wherein the CSI report includes at least one channel characteristic, the at least one channel characteristic takes into account the cross-link interference of the second UE, wherein the CSI report comprises information for a plurality of CSI reference signal (CSI-RS) resource indicators (CRIs), each CRI associated with a same channel measurement resource (CMR) and a different IMR corresponding to a different second UE, and wherein the configuration indicates a number of the CRIs to report.

17. The method of claim 16, wherein a quasi-co-location (QCL) assumption for measuring the IMR is the same as a QCL assumption for a channel measurement resource (CMR) for the CSI report.

18. The method of claim 17, wherein the configuration of the CSI report indicates the CMR and a respective IMR for each of a plurality of configured CRIs.

19. The method of claim 17, wherein one of the CRIs is associated with the same CMR and an IMR corresponding to downlink interference without cross-link interference transmitted by the second UE.

20. The method of claim 17, wherein the information for a subsequent CRI includes an indication of a difference of the at least one channel characteristic from the at least one channel characteristic for a first CRI.

21. A method of wireless communications at a base station, comprising:

transmitting a configuration of a channel state information (CSI) report to a first user equipment (UE), the configuration including an indication of a sounding reference signal or uplink demodulation reference signal transmitted by a second UE as an interference measurement resource (IMR);

scheduling the second UE to transmit the sounding reference signal or the uplink demodulation reference signal on the IMR; and receiving the CSI report from the first UE, wherein the CSI report includes at least one channel characteristic and the at least one channel characteristic takes into account cross-link interference of the second UE to the first UE, wherein the CSI report comprises information for a plurality of CSI reference signal (CSI-RS) resource indicators (CRIs), each CRI associated with a same channel measurement resource (CMR) and a different IMR corresponding to a different second UE, and wherein the configuration indicates a number of the CRIs to report.

22. The method of claim 21, wherein a quasi-co-location (QCL) assumption for measuring the IMR is the same as a QCL assumption for a channel measurement resource (CMR) for the CSI report.

23. The method of claim 21, further comprising scheduling a downlink transmission to the first UE or an uplink transmission from the second UE based at least in part on the CSI report from the first UE.

\* \* \* \* \*